Patented Aug. 22, 1950

2,519,622

UNITED STATES PATENT OFFICE 2,519,622

PROTECTION OF HIGH SURFACE XEROGELS

Raymond C. Archibald, Berkeley, and Frank T. Eggertsen, Oakland, Calif., assignors to Shell Development Company, San Francisco, Calif., a corporation of Delaware No Drawing. Application June 27, 1949, Serial No. 101,686

8 Claims. (Cl. 252—455)

This invention relates to the protection of microporous mineral substances having large available surfaces against the deteriorating action of steam. A specific embodiment of the invention relates to an improvement in the method of treating high surface xerogels to restore their efficiency after a period of use.

The object of the invention is to provide a way to protect various high surface, microporous mineral xerogels against the deteriorating action of steam in various cases and instances where contact of such xerogels with steam at elevated temperatures is specifically carried out or is inherent in other operations.

It is well known that a variety of mineral materials may, by suitable methods of preparation, be prepared in a form which may be converted by known methods into solid masses having a microporous structure affording a large surface area. Examples of such materials are the oxides of silicon, aluminum, magnesium, zirconium, chromium, tin and thorium. These various materials find numerous applications where solid non-combustible materials having very porous microstructures are desired. Typical examples of such uses are as adsorbents, desiccants, decolorizers, fillers, and in catalysts.

Since it is the microporous structure and concomitant large surface provided by such materials that is usually primarily desired, considerable attention has been given to methods for producing such materials in their most microporous form. In general, such materials are prepared by forming first a hydrous oxide and then removing water under carefully controlled conditions. The resulting materials are often referred to as xerogels. It is well known that such xerogels are irreparably damaged if overheated and, consequently, overheating is carefully avoided. It is also well known that such xerogels are irreparably damaged if contacted with steam for any extended periods at high pressures and/or high temperatures.

Despite the detrimental effect of steam upon these materials, it is often necessary to treat them with steam under conditions causing a loss of part of their available surface. In other cases, contact with steam under such conditions is inherent in their use. Many of these microporous materials are utilized as adsorbents, decolorizers, and in catalysts. In such cases it is often necessary to periodically treat them with steam in the process of reactivating them. In all such cases when the detrimental effect has been realized and the contact of steam could not be avoided, this loss of surface and microporous structure has been simply considered a normal loss of efficiency with use and accepted as a necessary evil. In order to reduce this evil to a minimum, two approaches have been followed. One has been to attempt by various means to decrease the contact with steam and the severity of the conditions to a minimum. The other has been to develop materials which are more rugged. A certain measure of success has been achieved in both directions. The production of more stable material has usually been through stabilization. Thus, for example, silica gels are stabilized somewhat by the incorporation of minor amounts of alumina and/or zirconia. Alumina gels are stabilized somewhat by the incorporation of minor amounts of silica and/or zirconia. Chromium oxide gels are stabilized somewhat by the incorporation of silica, alumina, zirconia or magnesia. These and other mixed or composite gels, although somewhat more stable are nevertheless still not sufficiently stable for many uses and are often severely damaged by contact with steam.

The tendency for the xerogel to be damaged by the action of steam depends upon the character of the xerogel and the conditions of the treatment, i. e. the temperature, pressure of steam, and the time. The more stable xerogels, e. g. silica-alumina blends, are not appreciably damaged by steam under mild conditions, i. e. a steam pressure not exceeding an atmosphere and a temperature not exceeding 100° C., even when the treatment is prolonged. Other less stable xerogels may, however, be appreciably damaged even under such mild conditions if the treatment is prolonged. As the temperature of the treatment is increased the rate of deterioration rapidly increases. The rate of deterioration also increases as the pressure of steam is increased. Under more severe conditions, even quite stable xerogels such as silica gel are severely damaged in a short time. For example, upon treating a sample of a commercial silica gel for one hour with saturated steam at about 250° C. (600 p. s. i. steam) the available surface dropped from about 531 m.²/g. to about 74 m.²/g. or by about 86%.

We have now found that the detrimental effect of steam on such materials is repressed by organic nitrogen bases. The organic nitrogen bases appear to be slightly more strongly adsorbed on the surface than water vapor and to somehow protect the surface against the deteriorating action of steam. Thus, the invention in its broader aspect consists in protecting the surface of these various microporous materials in any and all cases where they are subject to the action of steam under otherwise damaging conditions by the use of effective amounts of organic nitrogen bases in the steam.

Various organic nitrogen bases may be employed. The most effective organic nitrogen bases are the tertiary amines such as trimethyl amine, triethyl amine, tripropyl amine, tributyl amine and similar tertiary amines having dissimilar alkyl or cycloalkyl groups. Secondary amines, such as the secondary alkyl amines, piperidine and dicyclohexyl amine are somewhat less effective than the tertiary amines but also exert a good protective effect. The primary amines such as butyl amine, cyclohexyl amine and aniline are less effective but also exert a beneficial protective effect when used in sufficiently high concentrations and the conditions are not too severe. The various organic nitrogen bases may be used in various admixtures if desired. Thus, for example, the various mixtures of nitrogen bases extracted from petroleum oils by the use of acidic materials may be used. It is particularly to be pointed out that ammonia, which is not an organic nitrogen base, cannot be used. Ammonia, for some unexplained reason, has the opposite effect; that is, it catalyzes the deteriorating action of the steam.

The various basic organic nitrogen compounds are known to be readily adsorbed by xerogels of the type in question and particularly by those xerogels having an acid nature either by virtue of their composition or by virtue of subsequent treatment, e. g. acid washing. It is believed that it is through this adsorption of at least some of the organic nitrogen base from the steam that the observed protective effect is obtained.

The effectiveness of the organic nitrogen bases in preventing the deteriorating action of steam is more or less proportional to the concentration of the organic nitrogen base in the steam. Thus, small concentrations exert a mild protective action, and the protective action increases as the concentration increases. In practice, therefore, the concentration of organic nitrogen base may be adjusted to the minimum concentration affording the desired degree of stabilization under the conditions employed. As pointed out above, the severity of the conditions depends upon the character of the xerogel, the temperature, the pressure of steam and the length of time that the xerogel is subjected to the steam. The amount of organic nitrogen base to be added to the steam in any particular case is therefore largely dependent upon the particular circumstances and is governed largely by economic considerations. In some cases where the conditions are relatively mild quite small amounts in the order of 1 to 10 mol percent based on the steam will be sufficient and in other cases where the conditions are more severe, e. g. high steam pressure, amounts in the order of 33 mol percent or more may be necessary to obtain a reasonable protection. In no case has a complete protection been obtained.

The organic nitrogen base may be added to the water from which the desired mixture of organic nitrogen base and steam is generated under the desired working pressure, or the organic nitrogen base may be simply injected into superheated steam to produce the vaporous mixture, or the organic nitrogen base may be separately vaporized and the vapor mixed with the steam either in the treating zone or in a line leading thereto.

The described protective action is illustrated by the following experiments. In these experiments the xerogels were treated for one hour with saturated steam at about 250° C. in a 500 cc. autoclave (steam pressure about 600 p. s. i.). These severe conditions were purposely chosen to illustrate the effects in a relatively short period of time. In each case a period of a little less than one hour was required to bring the autoclave from room temperature up to the working temperature of 250° C. In each case the xerogel was suspended in the autoclave above the liquid level so that it contacted only the vapors.

A synthetic silica-alumina composite cracking catalyst designated CCC 27-28-29 and containing about 87.7% silica (dry basis) and having a microporous structure affording an available surface of 352 $m.^2/g.$ was treated with saturated steam at a temperature of 250° C. for one hour. As a result of this treatment the available surface of the material was reduced to about 74 $m.^2/g.$ The experiment was again repeated except that a mixture of water and ammonia (3:1 moles) was used. As a result of the treatment, the available surface was reduced to about 19 $m.^2/g.$ This illustrates the detrimental effect of ammonia.

The experiment was again repeated except that a mixture of water and quinoline (14:1 moles) was used. In this case the available surface was reduced to about 112 $m.^2/g.$ This illustrates the protective effect of the organic nitrogen bases.

The experiment was repeated again except that a mixture of water and triethyl amine (3:1 moles) was used. The available surface of the material was reduced to about 306 $m.^2/g.$ This illustrates the protective effect of tertiary aliphatic amines.

A commercial silica-zirconia zerogel containing about 4% of alumina and having an available surface of about 346 $m.^2/g.$ was steamed as in the above examples. The available surface decreased to about 49 $m.^2/g.$ When 17% triethylamine was added (2.22 moles water + 0.32 mole of amine) the available surface decreased to 177 $m.^2/g.$ A high surface silica zerogel containing about 12% alumina (available surface about 550 $m.^2/g.$) was steamed as in the above example. available surface decreased to about 128 $m.^2/g.$ When triethyl amine was added (2.22 moles water + 0.37 mole of amine) the available surface decreased to about 304 $m.^2/g.$ When the experiment was repeated using the same amount of diethyl amine instead of triethyl amine, the available surface decreased to about 195 $m.^2/g.$ (In the particular experiment the time of steaming was 75 min. instead of the usual 60 min.) When the experiment was repeated (60 min. steaming) using the same amount of secondary butyl amine ($C_4H_9NH_2$) instead of triethyl amine, the available surface decreased to about 199 $m.^2/g.$ (60 min. steaming).

Contact gels such, for instance, as synthetic siliceous cracking catalysts, after a period of use with organic reagents, contain considerable amounts of the organic reactants and/or reagents in the pores. Prior to regenerating or reactivating them, it is usually the practice to remove as much of such adsorbed material as possible by purging or stripping. For this purpose steam is very desirable and is usually used.

Deterioration of the gel by such purging or stripping may be reduced by supplying a small amount of organic nitrogen base vapors, e. g. a tertiary aliphatic amine, with the steam. In this case the temperature is usually relatively low, for instance 150° C. to 200° C., and relatively small amounts of organic nitrogen base, for instance 1 to 10 mol per cent based on the steam, and in some cases even less, may be sufficient. Also, in some cases it is necessary or desirable to contact the regenerated material with steam and, in such cases, the addition to the steam of a small amount of an organic nitrogen base, for instance ethanolamine, diethylamine or ethylene diamine, is advantageous.

This application is a continuation-in-part of application Serial Number 611,454, filed August 18, 1945, now abandoned.

We claim as our invention:

1. In the steaming of a microporous mineral xerogel, the improvement which comprises adding vapors of an organic nitrogen base to the steam to decrease the loss of surface of the xerogel caused by the action of the steam.

2. Method for reducing the loss of surface in high surface mineral xerogels while purging them with steam which comprises adding vapors of an organic nitrogen base to the steam.

3. Method according to claim 1 in which the microporous mineral xerogel consists largely of silica gel.

4. Method according to claim 1 in which the microporous mineral xerogel is a synthetic composite containing silica and alumina.

5. In the steaming of a microporous mineral xerogel, the improvement which comprises adding a tertiary amine to the steam to decrease the loss of surface of the xerogel caused by the action of the steam.

6. Method according to claim 5 in which the microporous mineral xerogel consists largely of silica gel.

7. Method according to claim 5 in which the microporous mineral xerogel is a synthetic composite containing silica and alumina.

8. In the steaming of a xerogel cracking catalyst consisting essentially of silica and alumina, the improvement which comprises adding a tertiary aliphatic amine to the steam whereby the loss of available surface of said xerogel caused by the action of the steam is decreased, compared to steaming the xerogel under the same conditions without the addition of said amine.

RAYMOND C. ARCHIBALD.
FRANK T. EGGERTSEN.

REFERENCES CITED

The following references are of record in the file of this patent:

UNITED STATES PATENTS

| Number | Name | Date |
|---|---|---|
| 1,772,055 | Miller | Aug. 5, 1930 |
| 2,283,172 | Bates | May 19, 1942 |
| 2,300,106 | Connolly | Oct. 27, 1942 |
| 2,348,072 | Kanhofer | May 2, 1944 |
| 2,412,868 | Brown | Dec. 17, 1946 |